US008032529B2

(12) United States Patent
Gupta et al.

(10) Patent No.: US 8,032,529 B2
(45) Date of Patent: Oct. 4, 2011

(54) ENHANCED BLOOM FILTERS

(75) Inventors: Shashank Gupta, Milpitas, CA (US);
Murali Basavaiah, Sunnyvale, CA (US);
John Fingerhut, Laguna Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 376 days.

(21) Appl. No.: 11/734,726

(22) Filed: Apr. 12, 2007

(65) Prior Publication Data
US 2008/0256094 A1    Oct. 16, 2008

(51) Int. Cl.
*G06F 17/30* (2006.01)
(52) U.S. Cl. .................... 707/736; 707/754
(58) Field of Classification Search ............ 707/100, 707/3, 2, 102, 736, 754, 609, 626, 638, 683
See application file for complete search history.

(56) References Cited

U.S. PATENT DOCUMENTS

| | | | |
|---|---|---|---|
| 2005/0108368 A1* | 5/2005 | Mohan et al. | 709/220 |
| 2005/0195832 A1* | 9/2005 | Dharmapurikar et al. | 370/395.31 |
| 2005/0257264 A1* | 11/2005 | Stolfo et al. | 726/23 |
| 2008/0147714 A1* | 6/2008 | Breternitz et al. | 707/102 |

OTHER PUBLICATIONS

Bloom Filter—Wikipedia defintion, downloaded Apr. 12, 2007.
Mitzenmacher et al., "Beyond Bloom Filters: Approximate Concurrent State Machines", downloaded from http://netseminar.stanford.edu/, http://netseminar.stanford.edu/sessions/2007-02-22.html, downloaded Apr. 12, 2007.

* cited by examiner

*Primary Examiner* — Charles Rones
*Assistant Examiner* — Fariborz Khoshnoodi
(74) *Attorney, Agent, or Firm* — Weaver Austin Villeneuve and Sampson LLP

(57) ABSTRACT

An interface is operable to receive an element for deletion from a bloom filter. The bloom filter includes multiple hash functions and an array. A processor is operable to generate hash function output values for the element using the hash functions. The hash function output values correspond to indices identifying bits in the array. A memory is operable to maintain supplemental data structure entries. The supplemental data structure has entries associated with the indices. The processor is operable to modify the supplemental data structure entries to delete the element from the bloom filter.

16 Claims, 6 Drawing Sheets

ENHANCED BLOOM FILTERS

TECHNICAL FIELD

The present disclosure relates to bloom filters used in a variety of applications.

DESCRIPTION OF RELATED ART

Bloom filters provide a mechanism for determining if an element is a member of a set. A bloom filter includes an array of N bits and K different hash functions. When installing an element, a system sends the element to the K different hash functions and uses hash function output values to set bits in the array. When determining the membership status of an element, the system checks array bits corresponding to the hash function output values. If all array bits corresponding to the hash function output values are set, the system deems the element to be a member of the set.

However, bloom filters have significant limitations. Consequently, it is desirable to provide improved methods and apparatus for using bloom filters in a variety of applications.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Figure 1:
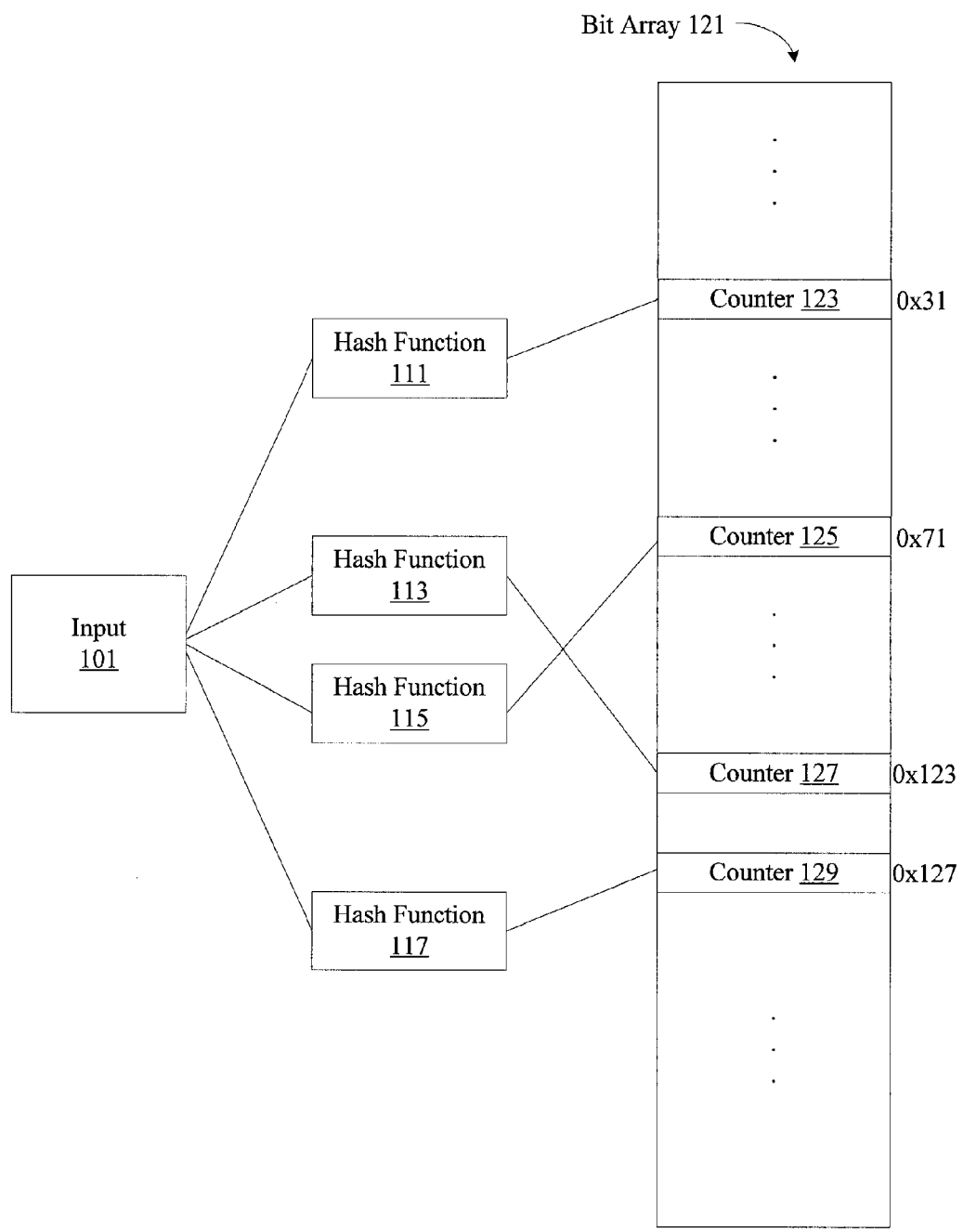
FIG. 1 illustrates a particular example of a bloom filter that uses counters.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular bloom filter applications. However, it should be noted that the techniques of the present invention apply to a variety of different applications and a variety of different devices. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

An interface is operable to receive an element for deletion from a bloom filter. The bloom filter includes multiple hash functions and an array. A processor is operable to generate hash function output values for the element using the hash functions. The hash function output values correspond to indices identifying bits in the array. A memory is operable to maintain supplemental data structure entries. The supplemental data structure has entries associated with the indices. The processor is operable to modify the supplemental data structure entries to delete the element from the bloom filter.

Example Embodiments

Bloom filters are data structures that allow a user to determine if an element is a member of a set. A bloom filter typically includes hash functions and an array. According to particular example embodiments, the array can be a multi-bit array, a multi dimensional, bitmap, etc. Bloom filters allow a system to perform membership tests using a smaller amount of memory than the system would need if it stored a full list of members or even a full list of abbreviated member identifiers. By avoiding an extensive lookup of a member, a system can avoid performing extensive database lookups and costly searches.

In particular example embodiments, a bloom filter includes multiple hash functions and a bit array. To add an element to a bloom filter, a system sends the element to the multiple hash functions to produce multiple hash function output values. A system sets particular array entries based on the hash function output values. In particular example embodiments, the hash function output value range is set to correspond to the bloom filter array size. For example, if a bloom filter array size is 100, the hash function is set to output values between 1 and 100. In a particular simplified example, an element 52827 is added by hashing the element 52827 to provide hash function output values 2, 6, 75, and 98 in a 100 entry array. A system uses the hash function output values 2, 6, 75, and 98 to set the bits at index positions 2, 6, 75, and 98 in the 100 entry array. To determine if an element is a member of a set, the system hashes the element and checks the array bits at the index positions corresponding to the hash function output values. If all of the array bits at the index positions are set, the element is deemed to be a member of the set.

However, multiple elements may sometimes set the same bits. For example, an element 90723 may have hash function output values 2, 6, 80, and 90 while an element 81372 may have hash function output values 10, 20, 75, and 98. If elements 90723 and 81372 are both added to the bloom filter, it will appear that element 52827 is a member of the set even if it was not added. Consequently, bloom filters do produce false positives. Also, because different elements often times set the same array entries, a system can not easily remove a member from a bloom filter without affecting the membership status of other members.

A wide variety of applications make use of bloom filters. In one particular example, a security application uses a bloom filter to determine if a list of trusted identifiers includes a particular member identifier. If a particular member identifier is included in a list of trusted identifiers, the security application may grant the member identifier particular access privileges. The bloom filter does not allow a system to determine the actual identifiers themselves, but this may actually provide security benefits. In another example, a simple spell checker includes as members of a bloom filter all of the words in dictionary. To perform a spellcheck, the system hashes the word to determine if array bits at index positions corresponding to hash function output values of the word are set. The spellcheck becomes a simple check on whether the word is included in a dictionary. In yet another example, the titles of all of the songs in a song library are included in a bloom filter. A user can check to determine if the song is included in the song library by using a bloom filter.

However, the memory savings and efficiency provided by bloom filters do have several drawbacks. Although a bloom filter does not produce false negatives, it does produce false positives. In a particular dictionary example, the word "cat" may set bits 1, 4, and 5 in an array based on hash function output values and the word "dog" may set bits 5, 6, and 8. A word "xfwgzi" may correspond to bits 4, 5, and 8. A user may have never added the word "xfwgzi" to a dictionary, but when a check for the word "xfwgzi" in the dictionary occurs, the word "xfwgzi" would be deemed to be included in the dictionary because the bits 4, 5, and 8 have been set by the words cat and dog. A bloom filter generally does not track what element set the bits. Also, a system cannot easily remove members from bloom filters unless a system increases the size of bloom filters significantly. In the dictionary example noted above, the word "dog" that set bits 5, 6, and 8 could not easily be removed because clearing the bits would affect the membership status of the word "cat", since both "dog" and "cat" share bit 5.

One technique for allowing the deletion of members from a bloom filter involves the use of counters. Each array entry includes a counter instead of merely at bit. To prevent counter overflow or saturation, designers set counters to 8 or 16 bits. When a system adds an element, the system increments counters at array positions corresponding to hash function output values of the element. As noted above, sometimes multiple elements set the same array entries, so it is typically difficult to remove an element without affecting the membership status of other element. However, a system can use counters to track how many times a particular element has been set. When a system deletes an element, the system decrements array entries corresponding to the hash function output values. Counters allow deletion of elements without affecting the membership status of other elements.

However, providing a counter for each array entry significantly increases the memory requirements of a bloom filter. For example, a relatively efficient 100,000 element bloom filter array would now have 100,000 entries 16 bits in size instead of 100,000 entries 1 bit in size.

FIG. 1 illustrates one example of a bloom filter. The bloom filter includes hash functions 111, 113, 115 and 117 and counter array 121. According to particular example embodiments, the hash functions 111, 113, 115, and 117 are operable to provide evenly distributed output values to the various entries in the array 121. In particular example embodiments, array 121 includes 200 entries, each including a counter having a particular size, such as 8 bits or 16 bits.

According to particular example embodiments, hash functions 111, 113, 115 and 115 take input 101 and generate hash function output values corresponding to positions 0x31, 0x123, 0x71 and 0x127 in array 121. If a system is checking membership of the input element 101 in the bloom filter, counters 123, 125, 127 and 129 at positions 0x31, 0x71, 0x123 and 0x127 in array 121 are identified. If the values of counters 123, 125, 127 and 129 are not 0, the input value 101 is deemed to be a member of the set. If one of the counters 123, 125, 127 and 129 is zero, the input value 101 is not a member of the set.

When a system adds an input value 101 to a bloom filter, the system increments by 1 the counters 123, 125, 127 and 129 corresponding hash function output values 0x31, 0x71, 0x123 and 0x127.

When an input value 101 is being removed from a bloom filter, entries 0x31, 0x71, 0x123 and 0x127 corresponding to hash function output values are checked to determine if the counters 123, 125, 127 and 129 are 0. If one or more of the counters is 0, the value 101 is not a member. Otherwise, the system decrements by 1 counters 123, 125, 127 and 129.

Having counters in each entry of array 121 provides one mechanism for allowing bloom filter deletions. However, maintaining counters in each array entry is expensive. Instead of having a single bit in each array entry, 8 or 16 bits are maintained for counters to account for potential saturation. For an array oftentimes having many thousands of entries, maintaining counters in each entry can be resource intensive.

Particular example embodiments of the present invention recognize that only a fraction of entries in a bloom filter array are set at any given time. This keeps the number of false positives small. In one particular example for a 256 k bloom filter with 4 hash functions, only approximately 26 k members can be installed to keep an approximately 1% false positive rate. The number of bits set would be approximately 86 k. The number of bits set by 2 or more members would be approximately 16 k. The number of bits sets by 3 or more members would be approximately 2 k. Some calculations for these values are provided as follows:

| Bloom filter size | | 256 Kbits | |
|---|---|---|---|
| Number of hash functions | | 4 | |

| False Positive Rate | Number of members installed | Number of bits set | Bits set by >=2 members | Bits set by >=3 members |
|---|---|---|---|---|
| 0.10% | 13107 | 47564 | 4568 | 288 |
| 0.50% | 20971 | 71792 | 10888 | 1120 |
| 1.00% | 26214 | 86268 | 16264 | 2104 |
| 5.00% | 41943 | 123784 | 35432 | 7276 |

Consequently, a supplemental data structure such as a hash table, a ternary content addressable memory (TCAM), another array, etc. maintains counters only for the saturated entries in a bloom filter array. Since only a fraction of the bits in a bloom filter array have collisions, a supplemental data structure can be relatively small. When a system adds an element, the system checks array bits at indices corresponding to hash function output values for the element. If the array bits are 0, the system sets the array bits to 1. If the array bits are already 1, the system adds or increments entries in the supplemental data structure. To check membership, a system checks array bits at indices corresponding to hash function output values for the element. The system does not need to check the supplemental data structure for membership queries. To remove a member, the system checks array bits at indices corresponding to hash function output values for the element. The system may also decrement or remove supplemental data structure entries. If no supplemental data structure entry exists, the corresponding array bit is set to 0.

Figure 2:
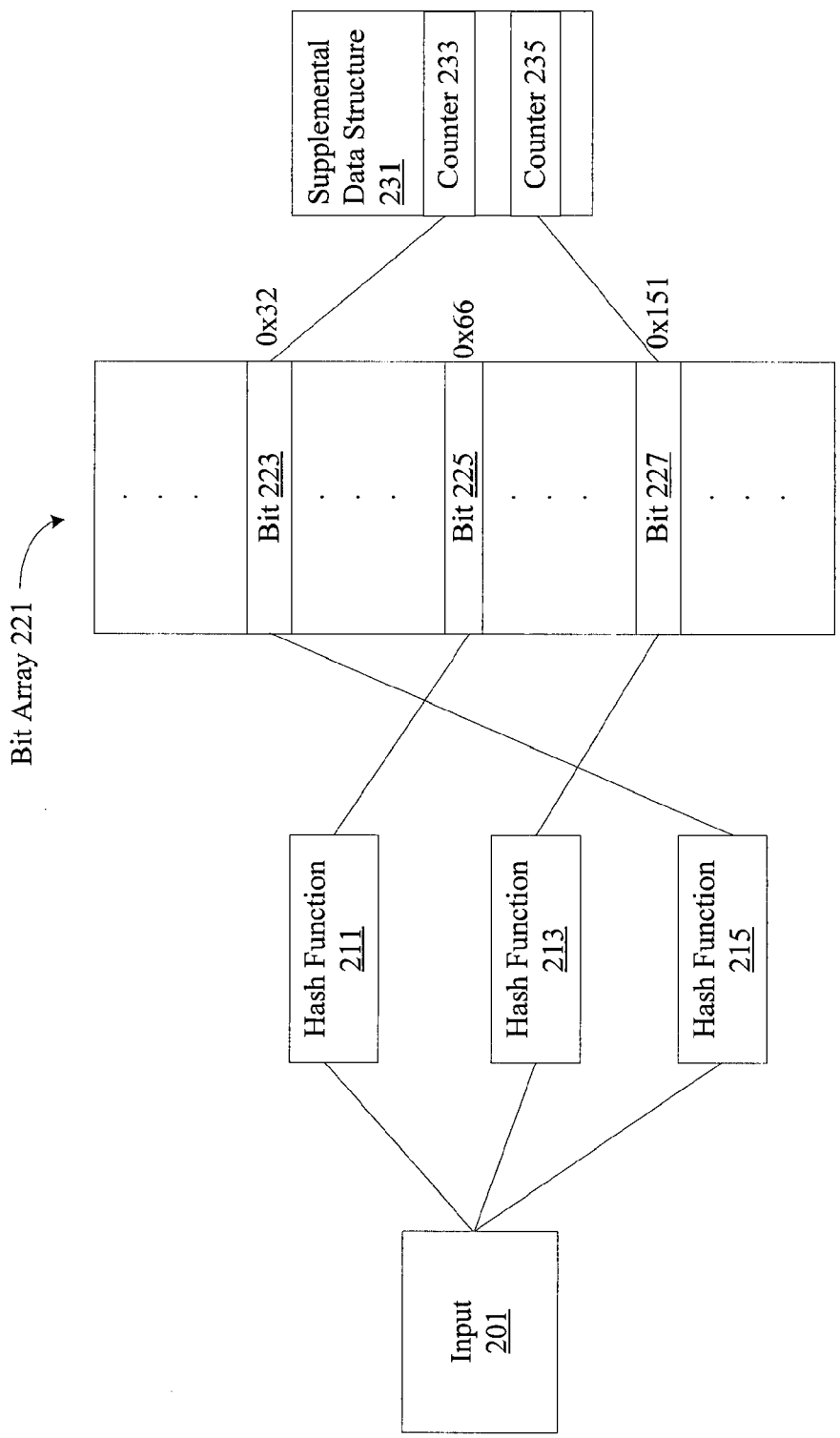
FIG. 2 illustrates a particular example of a bloom filter having array bits associated with supplemental data structure entries.

Using a supplemental data structure provides a resource efficient mechanism for allowing membership deletion. According to particular example embodiments, using a supplemental data structure adds some processing overhead for adds and deletes, but does not affect membership queries, which are a frequent operation in bloom filter use FIG. 2 illustrates one example of a bloom filter that uses a supplemental data structure. The bloom filter includes hash functions 211, 213, and 215. Bit array 221 includes numerous bit entries including entry 0x32 holding bit 223, entry 0x66 holding bit 225, and entry 0x151 holding bit 227. According to particular example embodiments, hash functions 211, 213, and 215 take input 201 and generate hash function output values corresponding to bit positions 0x32, 0x66, and 0x151 in bit array 221. If a system is checking membership of the input element 201 in the bloom filter, bits 223, 225, and 227 at positions 0x32, 0x66, and 0x151 in bit array 221 are identified. If the bits 223, 225, and 227 are set, the input value 201 is deemed to be a member of the set. If one of the bits 223, 225, and 227 is not set, the input value 201 is not a member of the set.

According to particular example embodiments, each entry in bit array 221 includes only a single bit. In other examples, each entry includes several bits. However, even including several bits in each entry in the bit array 221 still provides a significant resource savings over providing an 8-bit or 16-bit counter in every entry. An enhanced bloom filter only needs to provide a single bit or several bits in each entry as a supplemental data structure 231 is used to track entries that have been set numerous times. Without using a supplemental data structure, each entry has a counter that is relatively large to account for the fact that numerous input values may set the same bits. However, various example embodiments allow a supplemental data structure 231 to handle saturation of entries when numerous input values set the same entry in a bit array. In particular example embodiments, the supplemental data structure 231 only tracks entries that are not 0 or 1. In other particular example embodiments, the supplemental data structure 231 tracks entries that are not 0, 1, or 2.

When a system adds an input value 201 to a bloom filter, the system checks entries 0x32, 0x66, and 0x151 corresponding to hash function output values to determine bit values 223, 225, and 227. If the bit values are 0, the bit values can simply be set to one. If one or more of the bit values 223, 225, and 227 are already 1, the system checks a supplemental data structure 231. In one particular example, bits 223 and 227 are set. The system checks supplemental data structure 231 for entries corresponding to bit array entries 0x32 and 0x151. If an entry in the supplemental data structure 231 already exists, the system increments the value in the supplemental data structure entry. If an entry in the supplemental data structure 231 does not yet exist, the system creates a supplemental data structure entry and sets its value to 2.

According to particular example embodiments, the supplemental data structure 231 can be implemented using a variety of mechanisms. In some example embodiments, the supplemental data structure 231 is a hash table. In other examples, the supplemental data structure 231 is an array or a ternary content addressable memory (TCAM). According to particular example embodiments, the supplemental data structure 231 includes counters 233 and 235 corresponding to bit array entries 0x32 and 0x151.

When an input value 201 is being removed from a bloom filter, entries 0x32, 0x66, and 0x151 corresponding to hash function output values are checked to determine if the bit values 223, 225, and 227 are 0. If one or more of the bit values is 0, the value 201 is not a member. According to particular example embodiments, the bit values are 1 for bits 223, 225, and 227, and the supplemental data structure 231 is checked for entries corresponding to the bits 223, 225 and 227. Since there is no entry corresponding to bit 225, bit 225 is simply cleared. However, there are entries corresponding to bits 223 and 227, so counters 233 and 235 are decremented. According to particular embodiments, if any entry in the supplemental data structure goes below 2, it is deleted when the supplemental data structure only maintains collision counts of 2 or higher.

Figure 3:
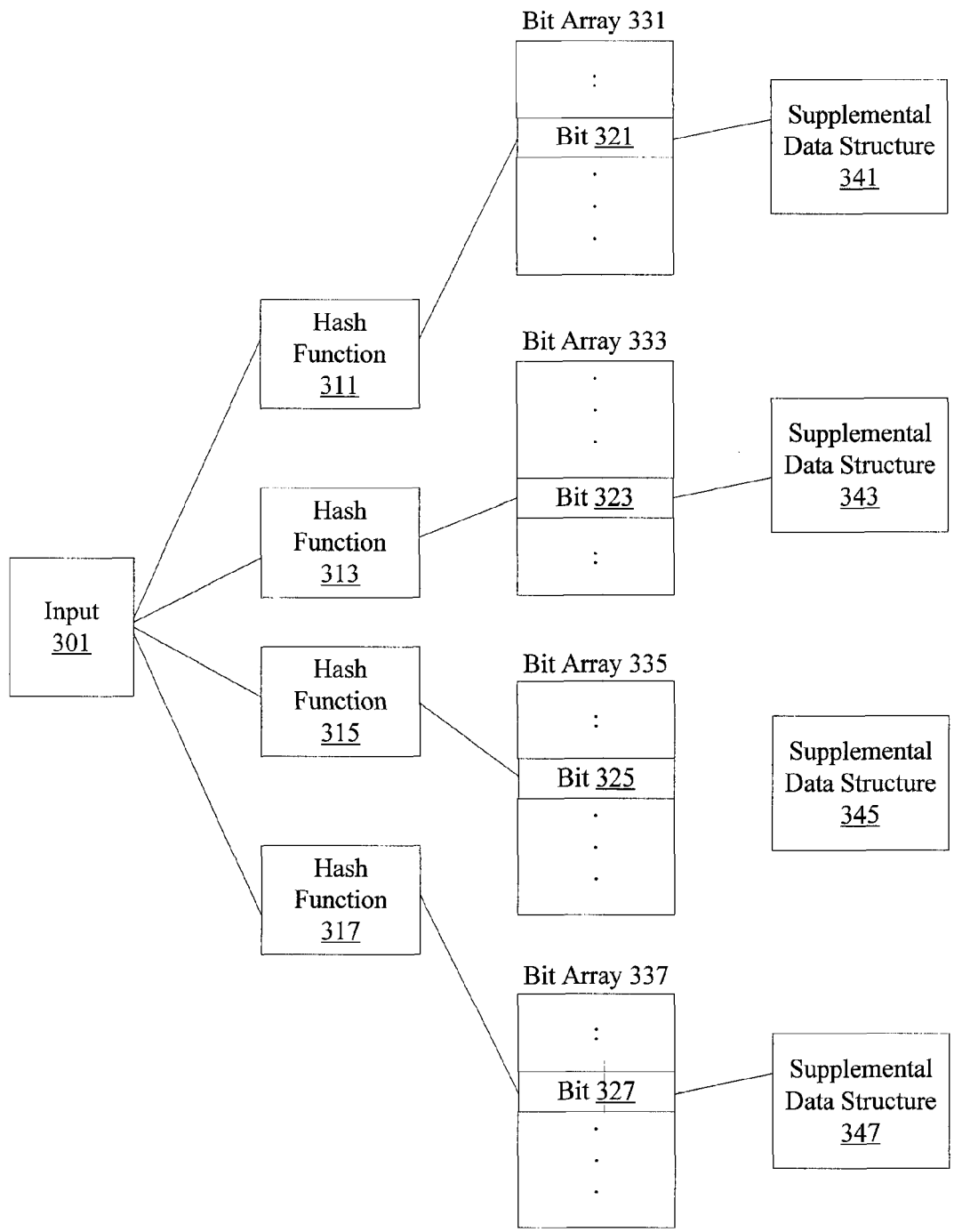
FIG. 3 illustrates a particular example of a bloom filter having array bits in separate arrays associated with supplemental data structure entries in separate supplemental data structures.

FIG. 3 illustrates a bloom filter having multiple supplemental data structures. The bloom filter includes hash functions 311, 313, 315, and 317. According to particular example embodiments, each hash function is associated with a bit array portion such as array 331, 333, 335, and 337. According to particular example embodiments, each hash function 311, 313, 315, and 317 is associated with an individual bit array portion 331, 333, 335, and 337 to allow simultaneous access by multiple hash functions to different memories or memory portions. In particular example embodiments, hash functions 311, 313, 315, and 317 take input 301 and generate hash function output values corresponding to bits 321, 323, 325, and 327. If a system is checking membership of the input element 301, the system determines the value of bits 321, 323, 325, and 327 in bit arrays 331, 333, 335, and 337. According to various particular example embodiments, if the bits 321, 323, 325, and 327 are all set, the input value 301 is deemed to be a member of the set. If one of the bits 321, 323, 325, and 327 is not set, the input value 301 is not a member of the set.

According to particular example embodiments, each entry in bit arrays 331, 333, 335, and 337 includes only a single bit. In other examples, each entry includes several bits. However, even including several bits in each entry still provides a significant resource savings over providing an 8-bit or 16-bit counter in every entry. According to particular example embodiments, multiple supplemental data structures allow further parallel processing. In particular example embodiments, supplemental data structures 341, 343, 345, and 347 are associated with bit arrays 331, 333, 335, and 337 respectively. However, various example embodiments allow supplemental data structures 341, 343, 345, and 347 to handle saturation of entries when numerous input values set the same entry in a bit array. In particular example embodiments, the supplemental data structures only need to keep track of entries that are not 0 or 1. In other particular example embodiments, the supplemental data structures are used to keep track of entries that are not 0, 1, 2, or 3.

According to particular example embodiments, a system adds an input value 301 to a bloom filter. Bits 321, 323, 325, and 327 corresponding to hash function output values are checked to determine bit values. If the bit values are 0, the bit values can simply be set to one. If one or more of the bit values 321, 323, 325, and 327 are already set to 1, the system checks the supplemental data structures. By using multiple bit arrays or portions of bit arrays and multiple supplemental data structures, a system can perform operations in parallel, particularly if hardware such as specially configured devices or memory are used. In one particular example, bits 321, 323, and 327 are already set. The system checks supplemental data structures 341, 343, and 347 for entries corresponding to bits 321, 323, and 327. If entries in the supplemental data structures 341, 343, and 347 already exist, the values in the entries are incremented. If entries in one or more supplemental data structures 341, 343, and 347 do not yet exist, one or more entries are created and set to value 2.

According to particular example embodiments, the supplemental data structures 341, 343, 345, and 347 are implemented using a variety of mechanisms. In some example embodiments, the supplemental data structures are a hash table. In other examples, the supplemental data structures are arrays or ternary content addressable memories (TCAMs). According to particular example embodiments, the supplemental data structures 341, 343, 345, and 347 include counters in each entry corresponding to bit array entries.

When an input value 301 is being removed from a bloom filter, the system checks bits 321, 323, 325, and 327 corresponding to hash function output values to determine bit values 321, 323, 325, and 327. If one or more of the bit values is 0, the value 301 is not a member. According to particular example embodiments, the bit values are 1 for bits 321, 323, and 327, so the supplemental data structures 341, 343, and 347 are checked for entries corresponding to the bits 321, 323, and 327. Since there is no entry corresponding to bit 325, bit 325 is simply cleared. However, there are entries corresponding to bits 341, 343, and 347 so the counters are decremented. According to particular example embodiments, if the counters become less than 2, the system can remove the entries.

Figure 4:
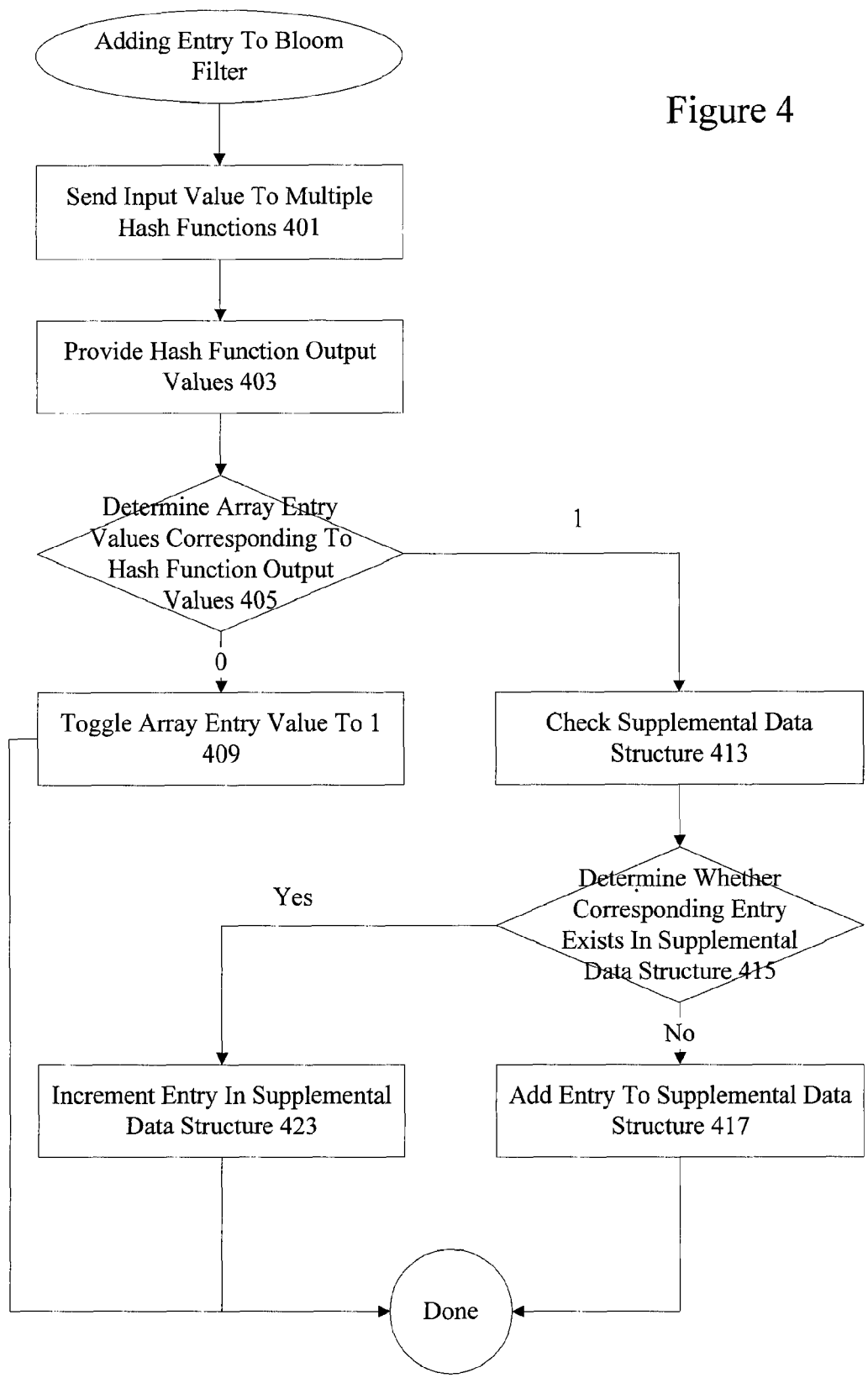
FIG. 4 illustrates a particular example of a technique for adding an element to a bloom filter.

FIG. 4 illustrates an example technique for adding new members to a bloom filter. At 401, an input value is sent to multiple hash functions. Various example system can use any number of hash functions. At 403, the hash functions provide output indices that allow determination of positions in a bit array. In particular example embodiments, it should be noted that a bit array can include multiple memory blocks. In one particular simplified example, an input value 11010111 is sent to four different hash functions to provide four indices 1101 1001 0001 and 1111. Some of the entries at these indices are set due to hash function output on different input values. However, other may not be set. The array entries at the positions indexed by the hash function are identified at 405. In particular example embodiments, the array entries are single bits, although multiple bit array entries are possible.

If the array entry value is 0, then the array entry value is toggled to 1 at 409. If the array entry value is 1, a supplemental data structure is checked at 413. If no entry exists in the supplemental data structure at 415, an entry is added at 417. According to particular example embodiments, the entry in the supplemental data structure is set to a count of 2 at 417. In particular example embodiments, the supplemental data structure is a hash table. If an entry does exist in the supplemental data structure, the entry in the supplemental data structure is incremented at 423.

According to particular example embodiments, the supplemental data structure only tracks entries that have at least a count of 2. Consequently, a supplemental data structure can remain relatively small. Every array entry does not require a large counter. Instead, each array entry may include a single bit or a several bit counter. A supplemental data structure tracks saturated array entries. Since a supplemental data structure only holds data for saturated entries, the supplemental data structure can remain relatively small. In particular example embodiments, for false positive rates of less than 1% and with the supplemental data structure keeping counts of 2 and more, size of the supplemental data structure needed is less than 10% of the number of entries in the bloom filter array. In particular example embodiments, a device can optionally implement a supplemental data structure using a ternary content addressable memory (TCAM) for rapid lookup.

Figure 5:
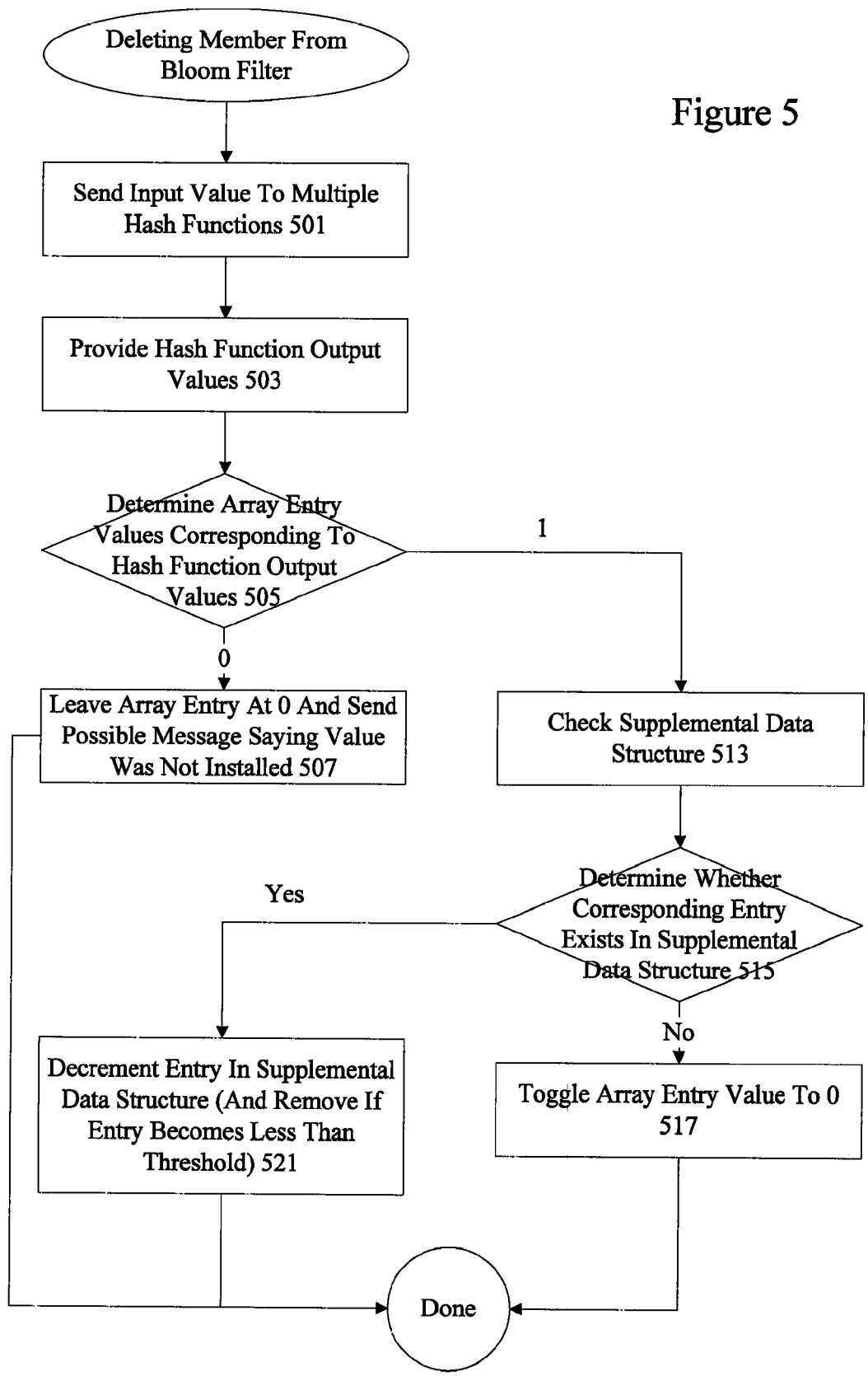
FIG. 5 illustrates a particular example of a technique for removing an element form a bloom filter.

FIG. 5 illustrates an example technique for deleting members from a bloom filter. At 501, an input value is sent to multiple hash functions. At 503, the hash functions provide output indices that allow determination of positions in a bit array. In one particular simplified example, an input value 11110001 is sent to four different hash functions to provide four indices 0001 1000 0011 and 0111. According to particular example embodiments, the entries at these indices should already be 1. Some entries may have been set multiple times because multiple input values may be hashed to the same array entry. The array entries at the positions indexed by the hash function are identified at 505. In particular example embodiments, the array entries are single bits, although multiple bit array entries are possible.

If the array entry value is 0, then the array entry value is left at 0. According to particular example embodiments, a message or an error is also sent to indicate that the array entry value was already clear at 507. If the array entry value is 1, a system checks a supplemental data structure at 513. If no entry exists in the supplemental data structure, the system toggles the array entry value to 0 at 517. If an entry exists in the supplemental data structure, the system decrements the entry at 521. If the entry goes below the threshold value, e.g. 2, the system removes the entry from the supplemental data structure.

Figure 6:
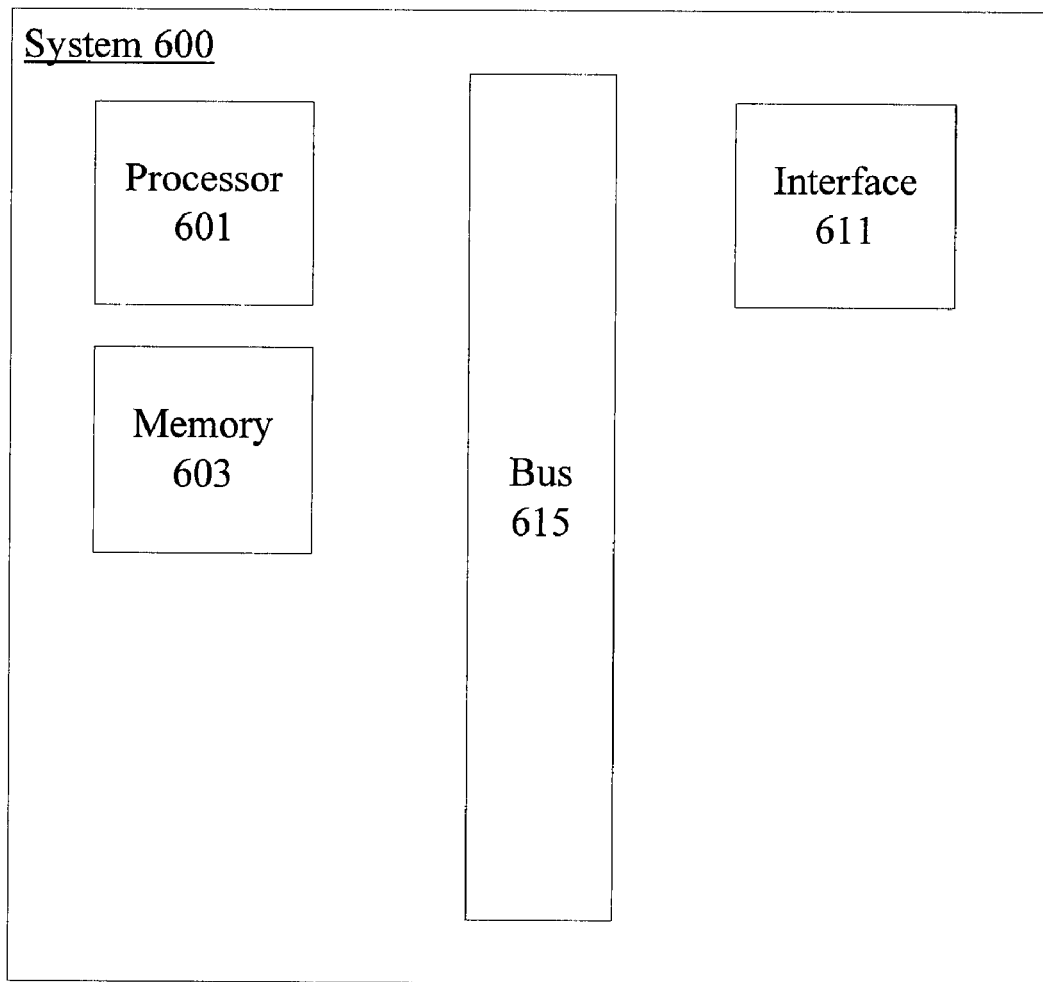
FIG. 6 illustrates a particular example of a computer system.

A variety of devices and applications can use particular examples of bloom filters. Server, routers, switches, line cards, can all implement bloom filters to perform various functions. FIG. 6 illustrates one example of a device that can use a bloom filter.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as bloom filter management. Various specially configured devices can also be used in place of a processor 601 or in addition to processor 601. The complete implementation can also be done in custom hardware. The interface 611 is typically configured to end and receive data packets or data segments over a network. Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. An apparatus, comprising:
    an interface configured to receive an element for deletion from a bloom filter, the bloom filter including a plurality of hash functions and an array;
    a processor configured to generate a plurality of hash function output values for the element using the plurality of hash functions, the plurality of hash function output values corresponding to a plurality of indices identifying a plurality of entries in the array, each of the plurality of entries comprising one or more bits;
    a memory configured to maintain a plurality of supplemental data structure entries in a supplemental data structure, the supplemental data structure configured to maintain supplemental data structure entries only for saturated entries in the array associated with the bloom filter, the plurality of supplemental data structure entries associated with the plurality of indices;
    wherein a first subset of the plurality of entries in the array are saturated and a second subset of the plurality of entries in the array are clear, and wherein the second subset of the plurality of entries do not have supplemental data structure entries;
    wherein the processor is configured to modify-the plurality of supplemental data structure entries to delete the element from the bloom filter.

2. The apparatus of claim 1, wherein the apparatus is a line card.

3. The apparatus of claim 1, wherein the element is a source identifier and the bloom filter maintains information identifying a group of secured source identifiers.

4. The apparatus of claim 1, wherein the element is a source identifier and the bloom filter maintains information identifying a group of at risk source identifiers.

5. The apparatus of claim 1, further comprising removing one or more supplemental data structure entries when values maintained in the one or more supplemental data structure entries reach a threshold.

6. The apparatus of claim 1, wherein the plurality of supplemental data structure entries are ternary content addressable memory (TCAM) entries.

7. The apparatus of claim 1, wherein the plurality of supplemental data structure entries are hash table entries.

8. The apparatus of claim 1, wherein the hash table entries include a plurality of counters.

9. The apparatus of claim 7, wherein the processor is configured to use the hash table entries to maintain counters for the first subset of the plurality of entries.

10. A method, comprising:
    receiving an element for deletion from a bloom filter, the bloom filter including a plurality of hash functions and an array;
    generating a plurality of hash function output values for the element using the plurality of hash functions, the plurality of hash function output values corresponding to a plurality of indices identifying a plurality of entries in the array, each of the plurality of entries comprising one or more bits;
    identifying a plurality of entries in a supplemental data structure by using the plurality of indices, the supplemental data structure configured to maintain supplemental data structure entries only for saturated entries in the array associated with the bloom filter, the plurality of supplemental data structure entries associated with the plurality of indices,
    wherein a first subset of the plurality of entries in the array are saturated and wherein a second subset of the plurality of entries in the array are clear, and wherein the second subset of the plurality of entries do not have supplemental data structure entries;
    modifying the plurality of entries in the supplemental data structure to delete the element from the bloom filter.

11. The method of claim 10, wherein modifying the plurality of entries in the supplemental data structure comprises decrementing the plurality of entries.

12. The method of claim 10, wherein the plurality of supplemental data structure entries are hash table entries.

13. The method of claim 10, wherein the plurality of supplemental data structure entries are ternary content addressable memory (TCAM) entries.

14. The method of claim 10, further comprising removing one or more entries in the supplemental data structure when values corresponding to the one or more entries are zero.

15. The method of claim 10, further comprising using the supplemental data structure to maintain counters for the first subset of the plurality of entries.

16. An apparatus, comprising:
    means for receiving an element for deletion from a bloom filter, the bloom filter including a plurality of hash functions and an array;
    means for generating a plurality of hash function output values for the element using the plurality of hash functions, the plurality of hash function output values corresponding to a plurality of indices identifying a plurality of entries in the array, each of the plurality of entries comprising one or more bits;
    means for identifying a plurality of entries in a supplemental data structure by using the plurality of indices, the supplemental data structure configured to maintain supplemental data structure entries only for saturated entries in the array associated with the bloom filter, the plurality of supplemental data structure entries associated with the plurality of indices,
wherein a first subset of the plurality of entries in the array are saturated and wherein a second subset of the plurality of entries in the array are clear, and the second subset of the plurality of entries do not have supplemental data structure entries;

means for modifying the plurality of entries in the supplemental data structure to delete the element from the bloom filter.

* * * * *